United States Patent
Magistrado

(10) Patent No.: US 9,361,280 B2
(45) Date of Patent: Jun. 7, 2016

(54) WEB APPLICATION THEME PREVIEW BASED ON LIVE PREVIEWS

(71) Applicant: Yahoo! Inc., Sunnyvale, CA (US)

(72) Inventor: Vince Magistrado, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 118 days.

(21) Appl. No.: 14/173,803

(22) Filed: Feb. 5, 2014

(65) Prior Publication Data

US 2015/0149891 A1    May 28, 2015

Related U.S. Application Data

(60) Provisional application No. 61/909,235, filed on Nov. 26, 2013.

(51) Int. Cl.
| | |
|---|---|
| *G06F 17/00* | (2006.01) |
| *G06F 17/22* | (2006.01) |
| *G06F 3/0482* | (2013.01) |
| *G06F 3/0484* | (2013.01) |

(52) U.S. Cl.
CPC .......... *G06F 17/2247* (2013.01); *G06F 3/0482* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 7,346,855 B2 | 3/2008 | Hellyar | |
| 2001/0048448 A1* | 12/2001 | Raiz | G06F 9/4443 715/700 |
| 2002/0163545 A1 | 11/2002 | Hii | |
| 2005/0278625 A1* | 12/2005 | Wessling et al. | 715/527 |
| 2006/0277167 A1 | 12/2006 | Gross | |
| 2007/0011258 A1 | 1/2007 | Khoo | |
| 2007/0038718 A1 | 2/2007 | Khoo | |
| 2008/0182628 A1* | 7/2008 | Lee | H04M 1/72563 455/566 |
| 2008/0189628 A1* | 8/2008 | Liesche | G06F 17/30867 715/762 |
| 2008/0238929 A1* | 10/2008 | Abdo | G06F 3/1454 345/581 |
| 2008/0282196 A1 | 11/2008 | Park | |
| 2009/0259936 A1 | 10/2009 | Tanskanen | |
| 2010/0083170 A1* | 4/2010 | Lim et al. | 715/810 |
| 2010/0088628 A1 | 4/2010 | Flygh | |
| 2011/0016194 A1* | 1/2011 | Von Haden | H04L 67/06 709/219 |
| 2011/0138313 A1 | 6/2011 | Decker | |
| 2012/0331393 A1* | 12/2012 | Danninger | G06Q 10/06 715/747 |
| 2014/0258101 A1* | 9/2014 | Svendsen | G06Q 50/184 705/39 |
| 2014/0279022 A1 | 9/2014 | Commagere | |
| 2015/0082214 A1* | 3/2015 | Roessler | G06F 3/04847 715/765 |
| 2015/0149951 A1 | 5/2015 | Magistrado et al. | |

OTHER PUBLICATIONS

U.S. Appl. No. 14/176,486, filed Feb. 10, 2014, Office Action, Feb. 16, 2016.

* cited by examiner

*Primary Examiner* — Keith Bloomquist
(74) *Attorney, Agent, or Firm* — Hickman Palermo Becker Bingham LLP

(57) ABSTRACT

Live preview of themes is provided. At least one invoked activity is detected in a web application. At least one candidate theme is obtained. The at least one candidate theme includes at least one style element for the web application. On the client device, display of a theme preview interface is caused. The theme preview interface includes at least one live preview. Each live preview corresponds to one of the at least one invoked activity and one of the at least one candidate theme. In response to selection of a selected theme, a current theme of web application is switched to the selected theme.

21 Claims, 8 Drawing Sheets

WEB APPLICATION THEME PREVIEW BASED ON LIVE PREVIEWS

CROSS-REFERENCE TO RELATED APPLICATIONS

Priority Claim

This application claims benefit of Provisional Appln. 61/909,235, filed Nov. 26, 2013, the entire contents of which is hereby incorporated by reference as if fully set forth herein, under 35 U.S.C. §119(e).

FIELD OF THE INVENTION

The present invention relates to web applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Themes are used to change the look and feel of applications. Themes contain preset definitions for graphical components, which are applied to the application. Themes allow a user to quickly personalize an application without individually changing each graphical component. Furthermore, the publisher of the application may not wish to allow each graphical component to be changed individually. The publisher of the application may thereby ensure that the product is displayed in a usable and consistent manner across the available themes.

Applications that provide themes may also provide a theme-switching interface. In these applications, the theme-switching interface displays previews for the themes by showing pre-generated images for a generic state of the application.

DETAILED DESCRIPTION

Figure 1:
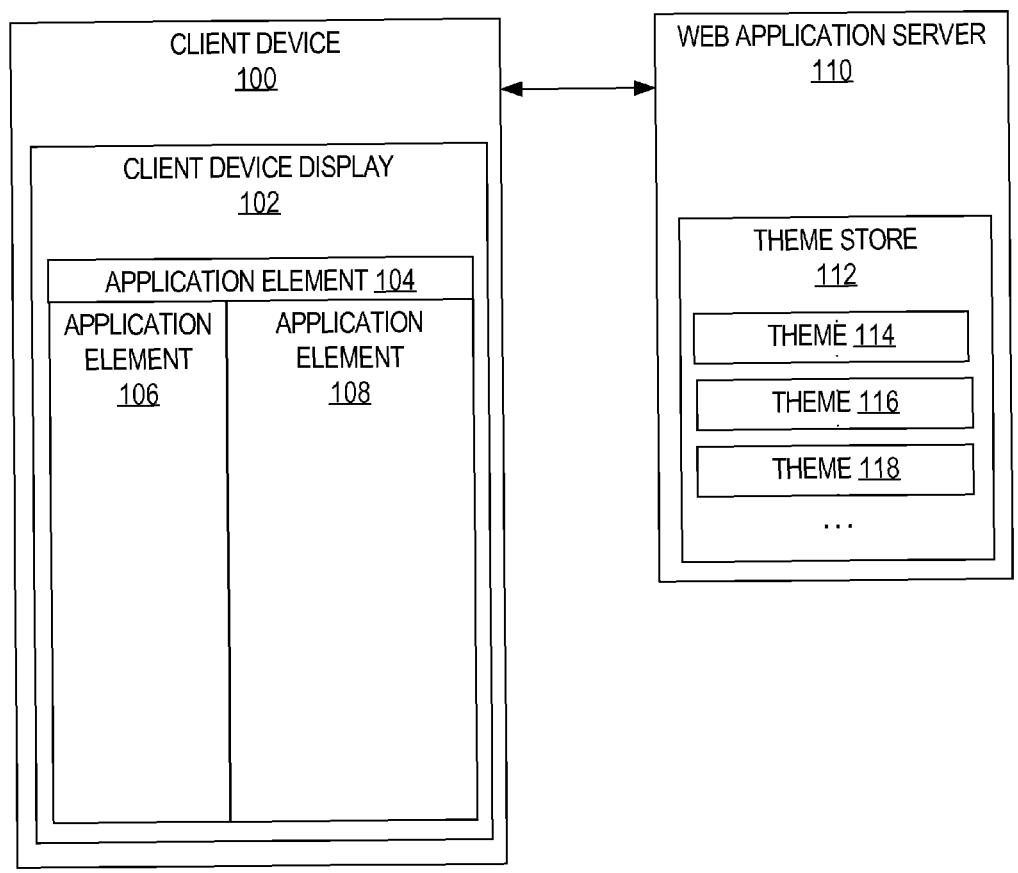
FIG. 1 illustrates an embodiment of a system including a web application that supports themes.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Clients typically interact with web applications by performing one or more activities supported by the web applications. For example, in an e-mail web application, activities may include viewing the Inbox, viewing another folder, viewing an e-mail, composing an e-mail, and other functionality supported by the web application. In a multi-tasking web application, an activity is "invoked" the first time that the activity is performed during a session. When a client switches from a first activity to a second activity, such as by invoking a new activity or switching to a previously invoked activity, the first activity is no longer shown in the foreground. However, the first activity is still managed as a background activity in the web application.

A live preview is a real time visual representation that reflects the current state of an invoked activity. For example, while the activity of viewing the Inbox is a background activity, a user may receive new e-mails in his Inbox. A live preview of the "viewing the Inbox" activity would be a visual representation in which the two new emails are present in the Inbox.

As explained above, themes contain preset definitions for graphical components of a web application. Techniques are described hereafter for previewing at least one prospective theme using live previews of invoked activities. According to the technique, at least one invoked activity invoked in a web application is detected. At least one prospective theme is obtained. The at least one prospective theme includes at least one style element for the web application. On the client device, display of a theme preview interface is caused. The theme preview interface includes at least one live preview. Each live preview corresponds to one of the at least one invoked activity and one of the at least one prospective theme. In response to selection of a selected theme, a current theme of web application is switched to the selected theme.

In a theme preview interface, live previews may be provided for multiple themes in one or more invoked activities. Alternatively or in addition, live previews may be provided for one theme in multiple invoked states. Live previews may be generated for prior activities that may appear hidden from a user's perspective. For example, in a single-page application configured to display a foreground activity in the foreground of a web application, a live preview may be generated for an activity other than the foreground activity, even if the activity is not displayed in any other display area of the web application.

Web Application

As used herein, the term "web application" refers to any application that is coded in a browser-supported programming language, including but not limited to JavaScript. The web application may be a rich Internet application. A web application may be delivered to a browser over a private network or a public network (e.g. the World Wide Web), and may include browser-supported markup language that may be rendered in a browser, including but not limited to HyperText Markup Language (HTML).

As used herein, the term "browser" refers to any software application capable of retrieving resources over a network, such as the World Wide Web, and presenting the resources in a browser-like display area. The term includes but is not limited to standard browsers, such as Chrome, Firefox, and Internet Explorer. A browser may be a mobile app that includes a browser-like display area, wherein the mobile app is configured to run on a mobile device operating system. The web application may run in a browser, including applications comprising a browser-like display area.

The web application is configured to detect at least one invoked activity of the web application. A client interacts with the web application by performing one or more activities supported by the web application. For example, in an e-mail web application, activities may include viewing the Inbox, viewing another folder, viewing an e-mail, composing an e-mail, and other functionality supported by the web application. In a multi-tasking web application, the activity is "invoked" the first time that the activity is performed during a session. When the client switches to another activity, such as by invoking a new activity or switching to a previously invoked activity, the activity is no longer shown in the foreground. However, the activity is still managed as a background activity in the web application.

Examples of activities that can be invoked in a web application include viewing a document and/or group of documents, composing a document, performing a search, or other activities enabled in the web application. A document may include an email, a Short Message Service (SMS) message, a Multimedia Messaging Service (MMS) message, a social media post, any other message, a calendar event, a file, an image, a video, any other graphical and/or text-based document, or any other document that the web application is enabled to handle. A group of documents may be a folder, documents associated with a thread, documents associated with a tag, documents associated with a user, document associated with the group of users, or any other grouping of documents. An activity may be specific to a specific document and/or group of documents. For example, viewing a first document may be considered a separate activity from viewing a second document, and viewing an Inbox of an email account may be considered a separate activity from viewing another folder of the same email account.

In one embodiment, when certain types of activities are invoked in a web application during a current session, data about the activities are automatically generated in the background. For example, data may be generated in the background each time viewing, composing or searching is performed. Data about the invoked activities may be maintained in an HTML Document Object Model (DOM) tree associated with the web application, which shall be described in greater detail hereafter.

Themes

Themes allow a user of a web application to change the look and feel of the web application, thereby personalizing user experience. A theme comprises at least one style element for the web application. When a web application has many themes from among which a user may choose, the themes are referred to herein as "candidate themes". In one embodiment, the look and feel of each theme is based, at least in part, on a corresponding stylesheet, such as a CSS stylesheet. As used herein, the term "stylesheet" refers to any style information that may be applied to the content of a web document, where the style information is separated from the content of the web document. A candidate theme may also be associated with one or more "configuration objects", such as a background image, browser-supported programming language instructions such as JavaScript code, or other configuration objects suitable for a theme.

Before a user selects a theme from among a set of candidate themes, a preview of the theme is provided. In the prior art, theme previews are provided using scaled-down images that represent screen captures of the web application displaying one or more foreground activities.

Live previews, in contrast, are dynamically generated for a particular theme and a particular invoked activity of the web application. Each live preview is a visual representation of a current state of at least one invoked activity. By dynamically generating a live preview for a particular theme and a particular invoked activity of the web application, there is no need to store image captures or thumbnails of each activity in the context of each available theme. Furthermore, a stored image capture or thumbnail would provide an example of an application state in the context of a specific theme, but would not provide a live preview based on a current state of a specific activity. Using live previews, users can view the immediate effect a theme will have on the appearance of activities performed by the user.

Theme-Supporting Web Application System

FIG. 1 illustrates an embodiment of a system including a web application that supports themes. Client device 100 is configured to access a web application over a network from web application server 110. Client device 100 includes client device display 102. Client device display 102 is configured to display one or more application elements 104-108. In one embodiment, the web application is a single-page application having no background display area to display an activity other than the foreground activity. Alternatively, the web application may be a multi-page application that includes at least one background display area.

A plurality of themes 114-118 may be available to change the look and feel of the web application. Themes 114-118 include at least one style element for the web application. For example, themes 114-118 may modify how at least one of application elements 104-108 is displayed. In one embodiment, themes 114-118 each include a stylesheet, such as a CSS stylesheet. Themes 114-118 may also include one or more configuration objects, such as a background image, browser-supported programming language instructions such as JavaScript code, or other configuration objects suitable for a theme. Themes 114-118 may be stored in a storage area of web application server 110, such as theme store 112. Theme store 112 may also reside remotely from web application server 110. In one embodiment, client device 100 obtains one or more themes from theme store 112 when the web application requests the theme/s.

The web application is configured to implement a theme preview interface. The web application may be configured to display a theme preview interface when a theme preview request is triggered. A user of the web application may trigger a theme preview request, such as by using a keyboard shortcut or by interacting with an element of the web application. Embodiments of the theme preview interface may be implemented to display: live previews of a single activity in the context of multiple themes; live previews of multiple activities in the context of a single theme; or live previews of multiple activities in the context of multiple themes. Embodiments of theme preview interfaces are described in greater detail hereafter at FIGS. 5A-5B.

FIGS. 4A-4D illustrate embodiments of a theme preview interface on a client device display. A theme preview interface may be displayed as an opaque, semi-transparent, or completely transparent interface with respect to one or more other visual elements of the web application. A theme preview interface may or may not have a distinct boundary. Live previews of a theme preview interface may be displayed as an opaque, semi-transparent, or completely transparent.

Figure 4A:
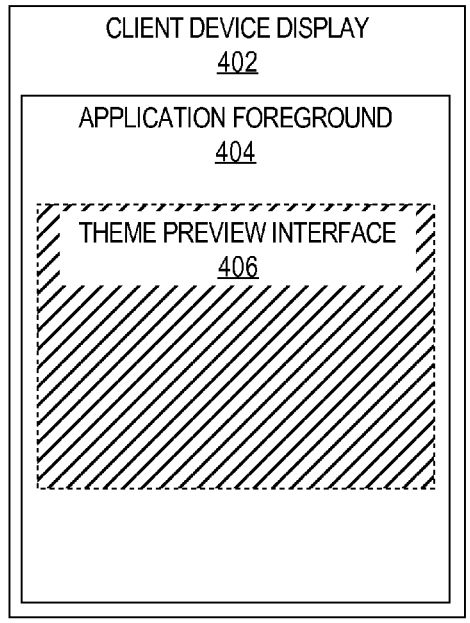
FIG. 4A-4D illustrate embodiments of a theme preview interface on a client device display.
Figure 4B:
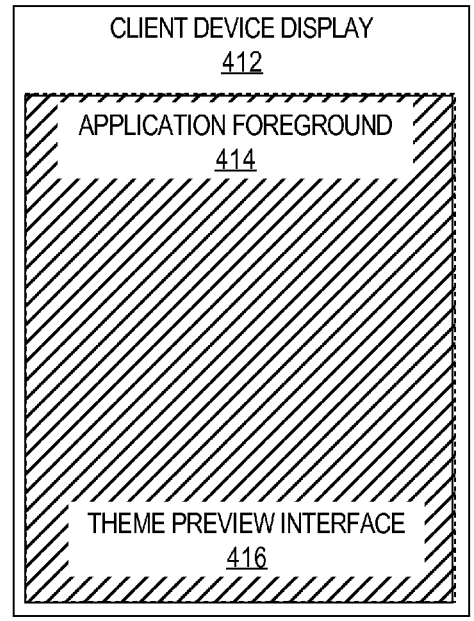
Figure 4C:
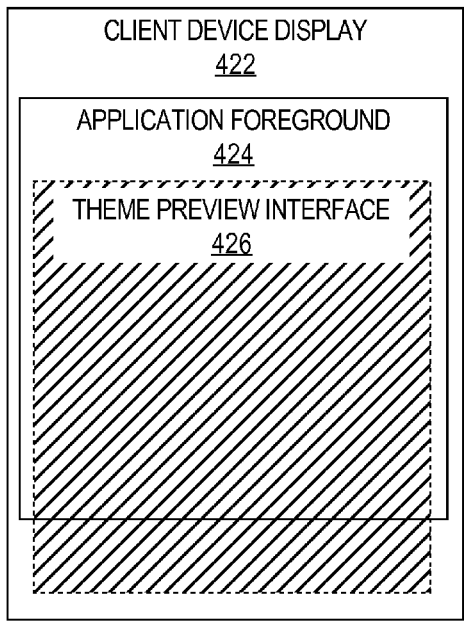
Figure 4D:
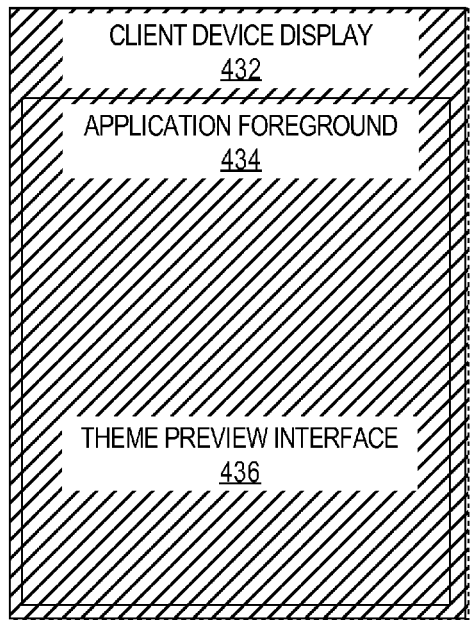

For example: in FIG. 4A, theme preview interface 406 is displayed inside application foreground 404 on client device display 402; in FIG. 4B, theme preview interface 416 is displayed within the boundaries of application foreground 404 on client device display 412; in FIG. 4C, theme preview interface 426 is displayed to overlap the boundaries of application foreground 424 on client device display 422; and in FIG. 4D, theme preview interface 436 is displayed full-screen on client device display 432, regardless of the boundaries of application foreground 434.

Invoked Activities

When an activity is invoked in a web application, an invoked activity may be detected. In one embodiment, the invoked activity is maintained in the HTML DOM tree corresponding to the web application, even if a foreground activity is switched in a single-page application such that the invoked activity appears hidden from a user of the client device.

Figure 2:
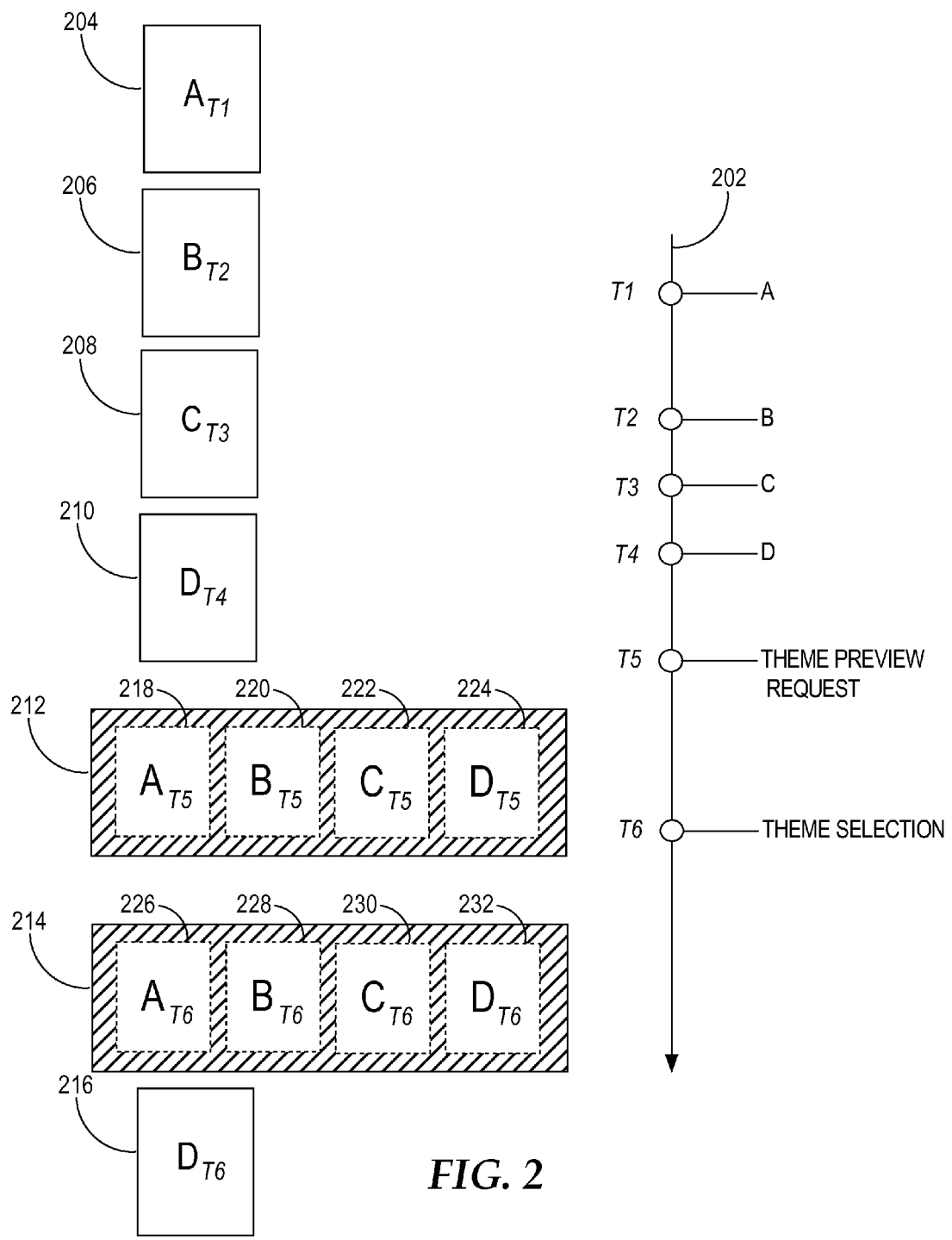
FIG. 2 illustrates embodiments of displayed elements in relation to activities invoked in the web application over time.

FIG. 2 illustrates embodiments of displayed elements in relation to activities invoked in the web application over time. The actions invoked in a web application are displayed in timeline 202.

At T1, activity A is invoked. Activity A corresponds to an invoked activity A, which is displayed in foreground element 204 of the web application at T1. At T2, activity B is invoked. Activity B corresponds to an invoked activity B, which is displayed in foreground element 206 of the web application at T2. At T3, activity C is invoked. Activity C corresponds to an invoked activity C, which is displayed in foreground element 208 of the web application at T3. At T4, activity D is invoked. Activity D corresponds to an invoked activity D, which is displayed in foreground element 210 of the web application at T4.

Figure 5A:
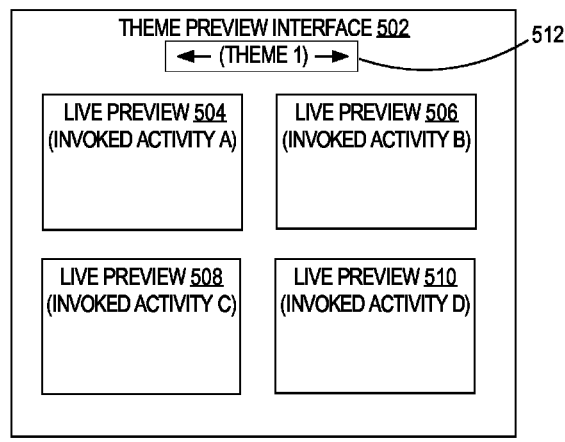
FIG. 5A illustrates an embodiment of a theme preview interface including live previews for multiple states of the application.
Figure 5B:
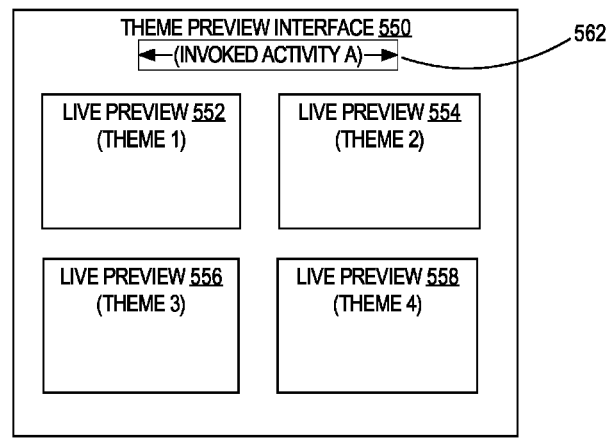
FIG. 5B illustrates an embodiment of a theme preview interface including live previews for multiple themes of the application.

At T5, a theme preview request is triggered in the web application. When the theme preview request is detected, theme preview interface 212 is generated and displayed. As shown, theme preview interface 212 includes live previews 218-224 for one theme. However, a theme preview interface may include one or more live previews for multiple themes, as shown in FIGS. 5A-5B.

Live preview 218 is a visual representation of invoked activity A at the current time, T5. Likewise, live previews 220-224 are visual representations of invoked activities B, C and D, respectively, at T5. In one embodiment, live previews 220-224 are currently updated to reflect invoked activities A-D in real time. For example, when the time is T6, the theme preview interface appears as shown in theme preview interface 214. Live previews 226-232 are visual representations of invoked activities A, B, C and D, respectively, at T6.

At T6, a theme selection is made. For example, when the theme preview interface displays one theme and multiple invoked activities, a user may select an option to switch the theme to the currently displayed theme. Theme selection may also be implemented in response to the selection a live preview, such as when multiple themes are displayed.

Element 216 represents the foreground element of the web application after the theme selection at T6. At T6, the foreground element of the web application contains invoked activity D. In response to theme selection at T6, the foreground element of the web application is switched to the selected theme and returns to the current invoked activity D. Alternatively, no theme selection may be made, and the application returns to the current invoked activity D without making a theme switch.

HTML DOM Tree

Figure 3:
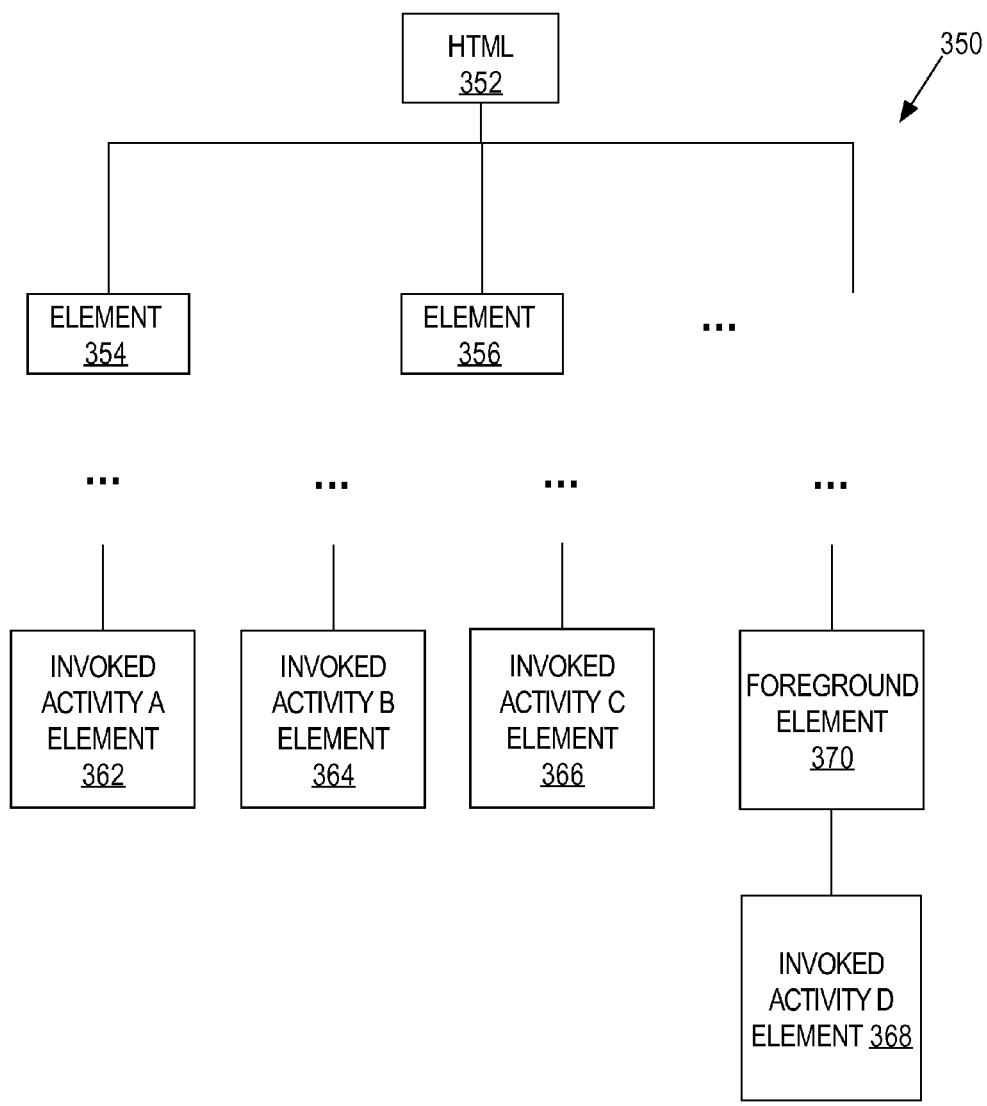
FIG. 3 illustrates an embodiment of a HyperText Markup Language (HTML) Document Object Model (DOM) tree.

FIG. 3 illustrates an embodiment of an HTML Document Object Model (DOM) tree. HTML DOM tree 350 includes a plurality of nodes 352-368. HTML DOM tree 350 is used by a browser to render elements of the web application on the client device. JavaScript, or any other browser-enabled programming language, may be used to manipulate the HTML DOM tree 350 corresponding to the web application.

In one embodiment, the web application is a single-page application with a foreground display area and no background display area to display an activity other than the foreground activity. Although multiple invoked activities may be detected, only one foreground activity is displayed on the client device. For example, at T4 of FIG. 2, invoked activity D is associated with a foreground activity that is displayed in the application foreground. At T4, invoked activities A, B and C have also been detected, but are not displayed in the application foreground. However, invoked activities A, B and C are still represented in the HTML DOM tree 350 as invoked activity A element 362, invoked activity B element 364, and invoked activity C element 366, respectively. At T4, invoked activity D element 368, corresponding to the foreground activity at T4, is a child of foreground element 370 of HTML DOM tree 350 of the web application. Although invoked activity A element 362, invoked activity B element 364, and invoked activity C element 366 may not be displayed in the web application, their presence in HTML DOM tree 350 allows for their usage in the generation of live previews. Additional details regarding handling the HTML DOM tree to provide live previews are provided hereafter.

Theme Preview Interface

A theme preview interface of the web application is configured to display one or more live previews. The theme preview interface may be configured to display live previews of a single activity in the context of multiple themes, multiple activities in the context of a single theme, and/or multiple activities in the context of multiple themes. Each live preview may be a scaled-down visual representation of the current state of a specific invoked activity in the context of a specific theme such as a thumbnail. Additionally, the scaled-down visual representation may be any visualization, such as a video, a 3-dimensional rendering, or any other visual representation.

In one embodiment, a live preview of the theme preview interface is generated by applying a CSS stylesheet associated with a specific theme to one or more objects in the HTML DOM tree associated with a specific invoked activity. Live previews may change in real time while the theme preview interface is displayed, reflecting a changing current state of the associated activities. In one embodiment, displaying the current state of an invoked activity in real time refers to simulating display of the activity as if the activity was running in the foreground of the web application.

FIG. 5A illustrates an embodiment of a theme preview interface including live previews for multiple states of the application. Theme preview interface 502 includes a plurality of live previews 504-510. Each live preview corresponds to a current state of a specific invoked activity of the web application in the context of a specific theme. Each of the invoked activities is detected when an activity is invoked in the web application. Live preview 504 is a visual preview of a current state of INVOKED ACTIVITY A in the context of THEME 1.

Live preview 506 is a visual preview of a current state of INVOKED ACTIVITY B in the context of THEME 1. Live preview 508 is a visual preview of a current state of INVOKED ACTIVITY C in the context of THEME 1. Live preview 510 is a visual preview of a current state of INVOKED ACTIVITY D in the context of THEME 1. Invoked activities A, B, C and D correspond to activities invoked in the web application, such as activities invoked during a current session of the web application on a client device.

In one embodiment, theme preview interface 502 is displayed when a specific theme is selected. The web application may include a separate theme selection interface (not shown), and theme preview interface 502 may be displayed when a specific theme is selected in the separate theme selection interface. Alternatively or additionally, theme preview interface 502 may include an integrated theme selection interface 512, and live previews 504-510 are dynamically changed based on the theme selected in the theme selection interface 512.

FIG. 5B illustrates an embodiment of a theme preview interface including live previews for multiple themes of the application. Theme preview interface 550 includes a plurality of live previews 552-558. Each live preview corresponds to a current state of a specific invoked activity of the web application in the context of a specific theme. Live preview 552 is a visual preview of a current state of INVOKED ACTIVITY A in the context of THEME 1. Live preview 554 is a visual preview of a current state of INVOKED ACTIVITY A in the context of THEME 2. Live preview 556 is a visual preview of a current state of INVOKED ACTIVITY A in the context of THEME 3. Live preview 558 is a visual preview of a current state of INVOKED ACTIVITY A in the context of THEME 4.

In one embodiment, theme preview interface 550 is displayed as a theme selection interface. Theme preview interface 550 may include an integrated invoked activity selection interface 562, and live previews 552-558 are dynamically changed based on the invoked activity selected in the invoked activity selection interface 562.

Theme preview interfaces 502 and 550 may be generated based on one or more objects in HTML DOM tree corresponding to the web application. For example, one or more stylesheets and/or browser-supported programming language code may be applied to the one or more objects of the HTML DOM tree. In one embodiment, JavaScript is applied to one or more objects of the HTML DOM tree, such as to manipulate, parse, and/or clone one or more objects and of the HTML DOM tree, which may include one or more subtrees. A CSS stylesheet corresponding to one or more themes may also be applied. CSS and/or JavaScript may also be used to scale and arrange HTML DOM tree information associated with the invoked activities to generate the theme preview interface with the live previews.

Figure 6A:
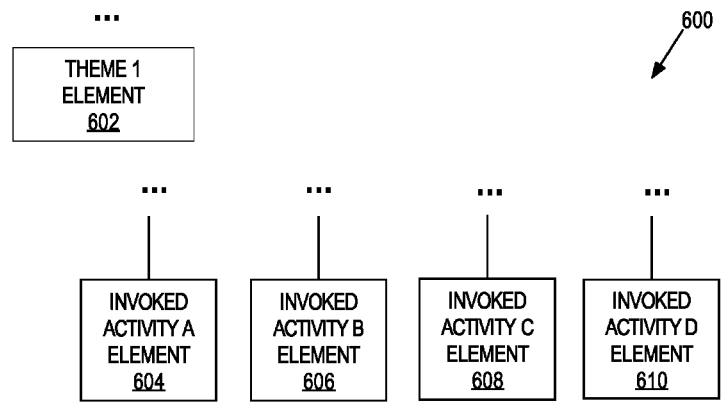
FIG. 6A illustrates an embodiment of a portion of an HTML DOM tree corresponding to a theme preview interface that includes live previews for multiple states.

FIG. 6A illustrates an embodiment of a portion of an HTML DOM tree 600 corresponding to theme preview interface 502 that includes live previews for multiple states. THEME 1 element 602 may be attached as an external stylesheet, such as in a <head> node of HTML DOM tree 600. THEME 1 element 602 is applied to invoked activity element A-D 604-610 to generate theme preview interface 502. Each invoked activity element A-D 604-610 corresponds to a subtree of objects that implement the corresponding invoked activity. In an embodiment where the web application is single-page web application, invoked activities elements A-D 604-610 may be maintained in HTML DOM tree 600 even when a corresponding invoked activity is not in the foreground of the web application.

Figure 6B:
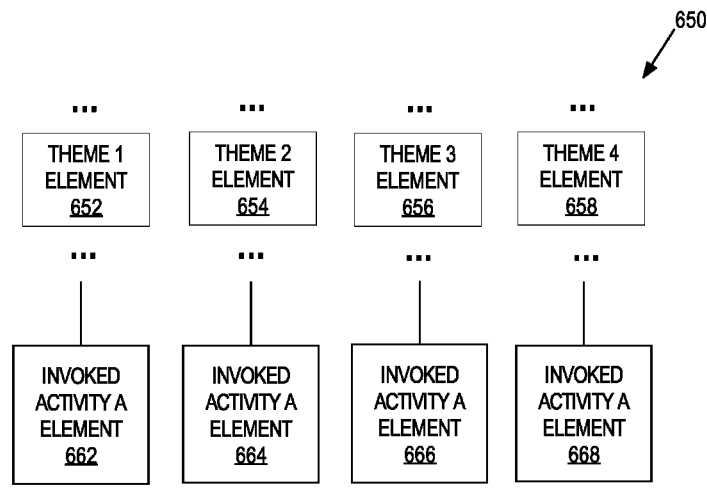
FIG. 6B illustrates an embodiment of a portion of an HTML DOM tree corresponding to a theme preview interface that includes live previews for multiple themes.

FIG. 6B illustrates an embodiment of a portion of an HTML DOM tree 650 corresponding to theme preview interface 550 that includes live previews for multiple themes. THEME 1-4 elements 652-658 may be attached as external stylesheets, such as in a <head> node of HTML DOM tree 650. In one embodiment, a subtree of the HTML DOM tree corresponding to invoked activity A is cloned (e.g. invoked activity A elements 662-668).

Theme Preview Method

Figure 7:
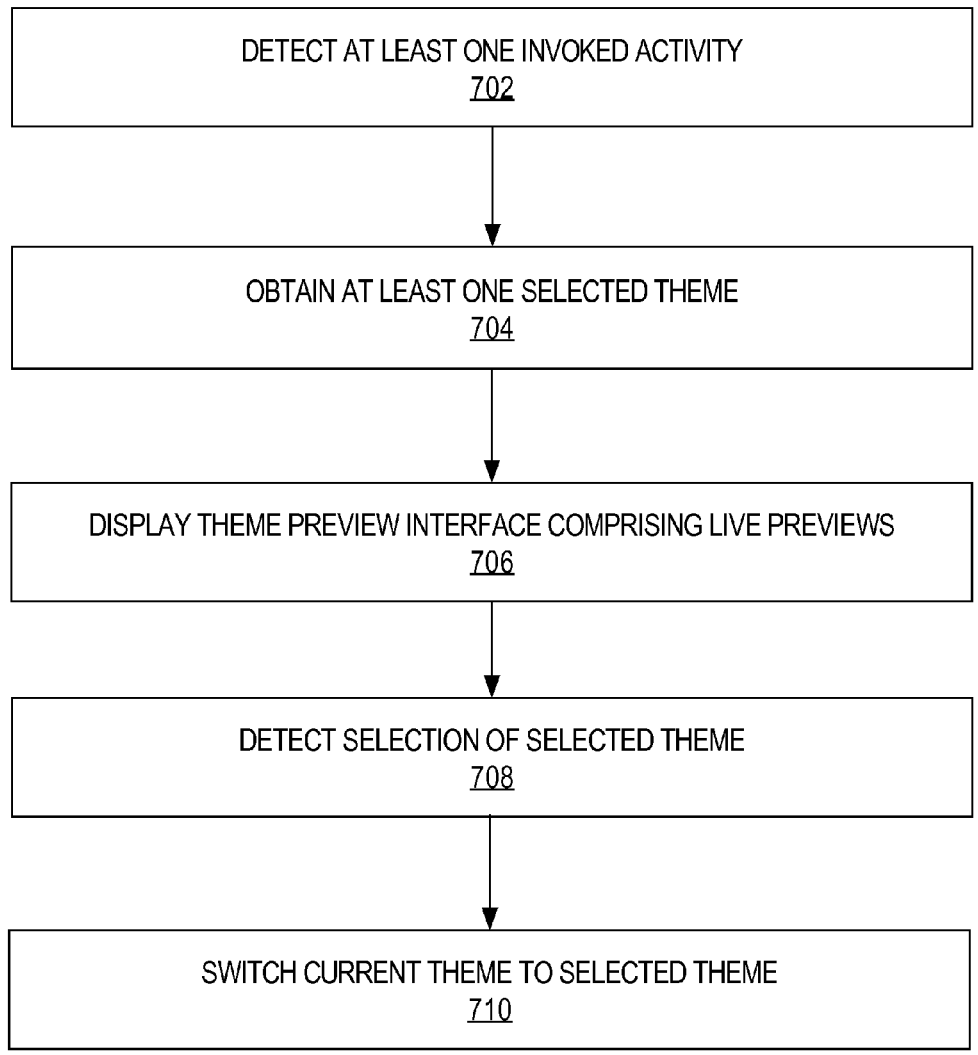
FIG. 7 is a flow diagram that illustrates an embodiment of a method for providing live previews for themes.

One embodiment is directed to a method for providing live previews for themes in a web application. FIG. 7 is a flow diagram that illustrates an embodiment of a method for providing live previews for themes. At a block 702, at least one invoked activity is detected in a web application. Each invoked activity corresponds to an activity invoked in a web application. In one embodiment, each invoked activity corresponds to one or more objects in the HTML DOM tree that are associated with the activity invoked.

Processing continues to block 704, where at least one candidate theme is obtained. In one embodiment, the at least one candidate theme is obtained, at a client device, from a web application server corresponding to the web application. Each candidate theme comprises at least one style element for the web application. In one embodiment, at least one candidate theme includes a stylesheet, such as a CSS stylesheet. A candidate theme may also include one or more configuration objects, such as a background image, browser-supported programming language instructions such as JavaScript code, or other configuration objects suitable for a theme.

Processing continues to block 706, where the method causes display, on the client device, of a theme preview interface. The theme preview interface comprises at least one live preview. Each live preview corresponds to one of the at least one invoked activity. Each live preview further corresponds to one of the at least one theme. For example, live previews may be displayed for a plurality of invoked activities using a specific candidate theme. In an embodiment, live previews are displayed for a specific invoked activity, such as a current invoked activity, using a plurality of candidate themes. Alternatively or in addition, a many-to-many relationship may exist such that live previews are displayed for a plurality of invoked activities using a plurality of candidate themes.

The theme preview interface may be generated based on one or more objects in HTML DOM tree corresponding to the web application. For example, one or more stylesheets and/or browser-supported programming language code may be applied to the one or more objects. In one embodiment, JavaScript is applied to one or more objects of the HTML DOM tree. A CSS stylesheet may also be applied. CSS and JavaScript may be used to scale and arrange HTML DOM tree information associated with the activities to generate the theme preview interface with the live previews.

Processing continues to block 708, where selection of a selected theme is detected. In one embodiment, the selected live preview is selected by a user using the theme preview interface. For example, when theme preview interface displays one theme and multiple invoked activities, a user may select an option to switch the theme to the currently displayed theme. Theme selection may also be implemented in response to the selection a live preview, such as when multiple themes are displayed.

Processing continues to block 710, where, in response to selection of a selected live preview of the at least one live preview, a current theme of the web application is switched to a selected theme corresponding to the selected live preview.

The current theme of the web application may be switched from a default theme comprising one or more default style elements.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
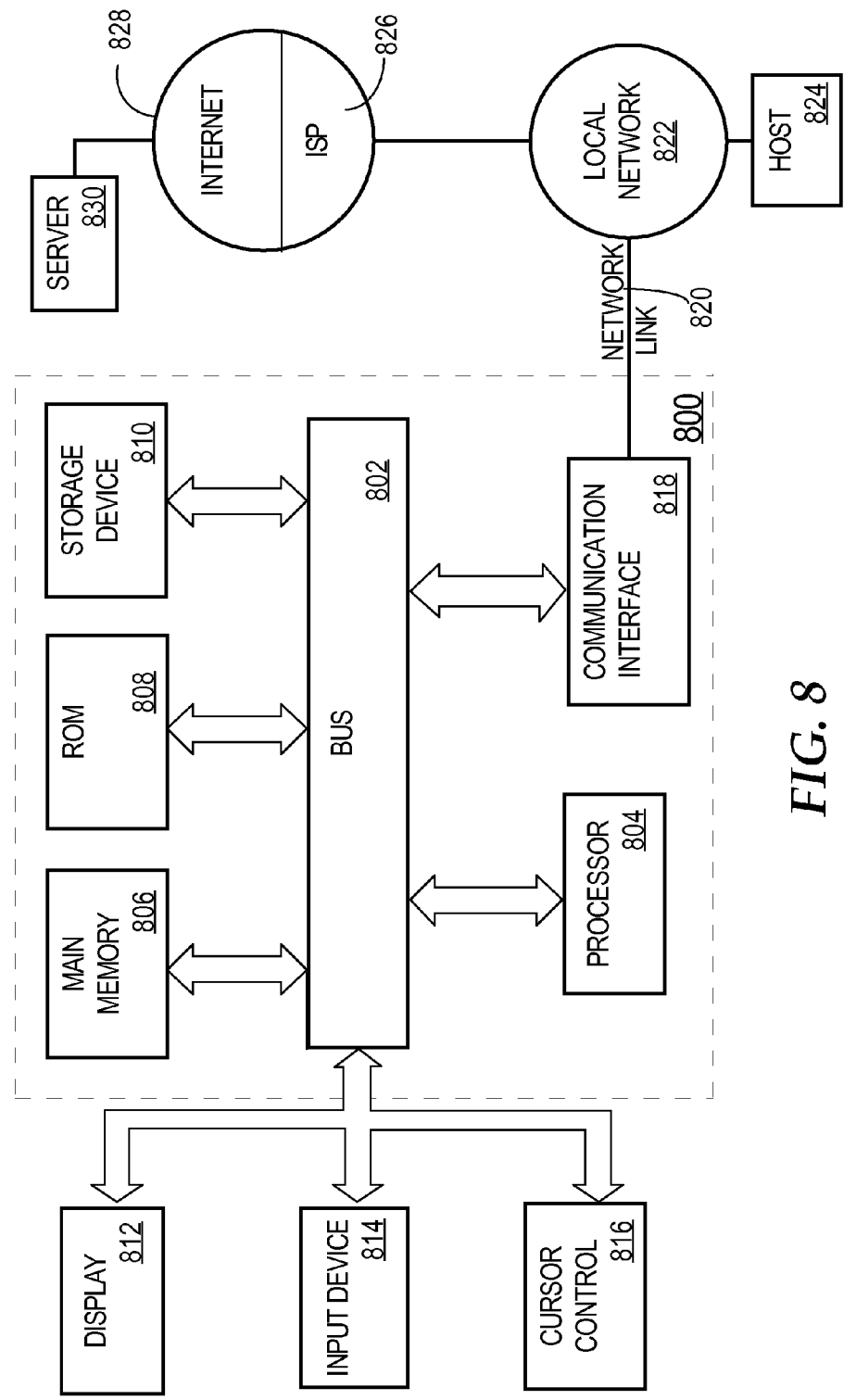
FIG. 8 illustrates a computer system upon which one or more embodiments may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   executing client-side code of a web application on a client device;
   maintaining on the client device, by the client-side code, state information of a set of invoked activities invoked by a user of the client device during a current session with the web application;
   wherein the set of invoked activities includes a particular activity;
   in response to user input, the client-side code generating and displaying a theme preview interface comprising a plurality of live previews;
   wherein each live preview of the plurality of live previews is a real time visual representation, of a current state of a corresponding invoked activity, that reflects a corresponding theme;
   wherein the plurality of live previews comprises one of:
      a plurality of live previews of a current state of the particular activity, wherein each of the plurality of live previews have a different corresponding theme, or
      a plurality of live previews, each of which correspond to a current state of a different invoked activity of the set of invoked activities, wherein each of the plurality of live preview have a common corresponding theme;
   wherein the method is performed by one or more computing devices.

2. The method of claim 1,
   wherein the state information of the set of invoked activities is maintained in an HTML DOM tree,
   wherein said each live preview is generated by applying at least one of JavaScript or CSS to an object in the HTML DOM tree corresponding to the corresponding invoked activity of the live preview.

3. The method of claim 1, wherein at least one live preview of the plurality of live previews is updated in real time while the theme preview interface is currently displayed.

4. The method of claim 1, wherein maintaining the state information of the set of invoked activities includes maintaining state information for one or more background invoked activities, wherein the client-side code does not currently display the one or more background invoked activities on the client device.

5. The method of claim 4,
   wherein the state information of the set of invoked activities is maintained in an HTML DOM tree,
   wherein at least one of the plurality of live previews corresponds to a background invoked activity that is not currently displayed.

6. The method of claim 1, wherein specific types of activities are automatically added to the set of invoked activities when invoked during the current session.

7. The method of claim 6, wherein the specific types of activities include composing a first specific document, viewing a second specific document, and searching a specific term.

8. The method of claim 1,
   wherein the theme preview interface includes a mechanism for selecting a target theme;
   in response to user selection of a particular target theme using the mechanism, the client-side code updating the state information to cause visual content related to the set of invoked activities to reflect the particular target theme.

9. The method of claim 8,
   wherein the state information of the set of invoked activities is maintained in an HTML DOM tree;
   wherein updating the state information comprises modifying at least one node of the HTML DOM tree based on the particular target theme.

10. The method of claim 1, further comprising:
    obtaining at least one advertisement based on a current state of one of the set of invoked activities;
    displaying the at least one advertisement in the theme preview interface with the plurality of live previews.

11. A non-transitory computer storage medium storing instructions which, when executed by one or more processors, cause performance of a method comprising the steps of:
    executing client-side code of a web application on a client device;
    maintaining on the client device, by the client-side code, state information of a set of invoked activities invoked by a user of the client device during a current session with the web application;
    wherein the set of invoked activities includes a particular activity;
    in response to user input, the client-side code generating and displaying a theme preview interface comprising a plurality of live previews;
    wherein each live preview of the plurality of live previews is a real time visual representation, of a current state of a corresponding invoked activity, that reflects a corresponding theme;
    wherein the plurality of live previews comprises one of:
       a plurality of live previews of a current state of the particular activity, wherein each of the plurality of live previews have a different corresponding theme, or
       a plurality of live previews, each of which correspond to a current state of a different invoked activity of the set of invoked activities, wherein each of the plurality of live preview have a common corresponding theme.

12. The non-transitory computer storage medium of claim 11,
    wherein the state information of the set of invoked activities is maintained in an HTML DOM tree, wherein said each live preview is generated by applying at least one of JavaScript or CSS to an object in the HTML DOM tree corresponding to the corresponding invoked activity of the live preview.

13. The non-transitory computer storage medium of claim 11, wherein at least one live preview of the plurality of live previews is updated in real time while the theme preview interface is currently displayed.

14. The non-transitory computer storage medium of claim 11, wherein maintaining the state information of the set of invoked activities includes maintaining state information for one or more background invoked activities, wherein the client-side code does not currently display the one or more background invoked activities on the client device.

15. The non-transitory computer storage medium of claim 14,
wherein the state information of the set of invoked activities is maintained in an HTML DOM tree,
wherein at least one of the plurality of live previews corresponds to a background invoked activity that is not currently displayed.

16. The non-transitory computer storage medium of claim 11, wherein specific types of activities are automatically added to the set of invoked activities when invoked during the current session.

17. The non-transitory computer storage medium of claim 16, wherein the specific types of activities include composing a first specific document, viewing a second specific document, and searching a specific term.

18. The non-transitory computer storage medium of claim 11,
wherein the theme preview interface includes a mechanism for selecting a target theme;
in response to user selection of a particular target theme using the mechanism, the client-side code updating the state information to cause visual content related to the set of invoked activities to reflect the particular target theme.

19. The non-transitory computer storage medium of claim 18,
wherein the state information of the set of invoked activities in maintained in an HTML DOM tree;
wherein updating the state information comprises modifying at least one node of the HTML DOM tree based on the particular target theme.

20. The non-transitory computer storage medium of claim 11, further comprising:
obtaining at least one advertisement based on a current state of one of the set of invoked activities;
displaying the at least one advertisement in the theme preview interface with the plurality of live previews.

21. A system comprising a processor and one or more stored sequences of instructions which, when executed by the processor, cause the processor to perform:
executing client-side code of a web application on a client device;
maintaining on the client device, by the client-side code, state information of a set of invoked activities invoked by a user of the client device during a current session with the web application;
wherein the set of invoked activities includes a particular activity;
in response to user input, the client-side code generating and displaying a theme preview interface comprising a plurality of live previews;
wherein each live preview of the plurality of live previews is a real time visual representation, of a current state of a corresponding invoked activity, that reflects a corresponding theme;
wherein the plurality of live previews comprises one of:
a plurality of live previews of a current state of the particular activity, wherein each of the plurality of live previews have a different corresponding theme, or
a plurality of live previews, each of which correspond to a current state of a different invoked activity of the set of invoked activities, wherein each of the plurality of live preview have a common corresponding theme.

* * * * *